US009068725B1

(12) United States Patent
Kuykendall et al.

(10) Patent No.: US 9,068,725 B1
(45) Date of Patent: Jun. 30, 2015

(54) TWIST AND LOCK GLASS SHADE MOUNTING SYSTEM AND METHOD OF ASSEMBLY

(75) Inventors: Dennis C. Kuykendall, Greer, SC (US); James Burns, Memphis, TN (US); Brendan Byrne, Germantown, TN (US); Bruce C. Nemec, Madison, WI (US); Jason Rohr, Palmyra, WI (US)

(73) Assignee: Palm Coast Imports, LLC, Germantown, TN (US)

( * ) Notice: Subject to any disclaimer, the term of this patent is extended or adjusted under 35 U.S.C. 154(b) by 265 days.

(21) Appl. No.: 13/492,260

(22) Filed: Jun. 8, 2012

(51) Int. Cl.

| | |
|---|---|
| ***F16B 37/02*** | (2006.01) |
| ***F21V 17/06*** | (2006.01) |
| *F21V 17/10* | (2006.01) |

(52) U.S. Cl.
CPC *F21V 17/06* (2013.01); *F21V 17/10* (2013.01)

(58) Field of Classification Search
CPC ......... F21V 17/00; F21V 17/06; F21V 17/10; F21V 17/12
USPC ............. 411/172, 173, 108, 109; 362/249.11, 362/435, 439, 443, 404–406, 433, 434, 353, 362/368, 378
See application file for complete search history.

(56) References Cited

U.S. PATENT DOCUMENTS

| | | | | |
|---|---|---|---|---|
| 753,977 | A * | 3/1904 | Hubbell | 430/496 |
| 959,205 | A | 5/1910 | D'Olier | |
| 1,056,682 | A | 3/1913 | Hubbard | |
| 1,086,426 | A | 2/1914 | Wakefield | |
| 1,310,228 | A | 7/1919 | Woodhead | |
| 1,426,951 | A * | 8/1922 | Boomer | 362/434 |
| 1,478,595 | A * | 12/1923 | Wooley | 248/343 |
| 1,663,655 | A | 3/1928 | Guth | |
| 1,702,888 | A * | 2/1929 | Balch | 248/343 |
| 1,856,142 | A * | 5/1932 | Wellington et al. | 248/343 |
| 1,901,235 | A * | 3/1933 | Glowacki | 248/343 |
| 2,671,821 | A * | 3/1954 | Zientowski et al. | 174/54 |
| 2,721,720 | A * | 10/1955 | Kruger | 248/343 |
| 2,736,528 | A * | 2/1956 | Le Brock | 248/317 |
| 3,141,488 | A * | 7/1964 | Wootton | 411/108 |
| 3,168,252 | A * | 2/1965 | Cabernoch | 362/404 |
| 3,252,493 | A * | 5/1966 | Smith | 411/108 |
| 3,379,872 | A * | 4/1968 | Devine, Jr. | 362/443 |
| 3,740,547 | A | 6/1973 | Contratto | |
| 4,438,344 | A | 3/1984 | Albert | |
| 4,878,159 | A | 10/1989 | Blaisdell | |
| 5,122,942 | A * | 6/1992 | Lee | 362/353 |
| 5,134,554 | A | 7/1992 | Donato | |
| 5,205,692 | A * | 4/1993 | Kelbert et al. | 411/173 |
| 5,335,159 | A | 8/1994 | Chen | |
| 5,588,741 | A * | 12/1996 | Huang | 362/267 |
| 6,273,590 | B1 | 8/2001 | Splane | |

(Continued)

*Primary Examiner* — Gary Estremsky
(74) *Attorney, Agent, or Firm* — Brian S. Steinberger; Law Offices of Brian S. Steinberger, P.A.

(57) ABSTRACT

Devices, systems and methods of converting the necks on lamp shades into threadable couplers that allow the shades with the couplers to be screwed onto the exterior threads on light sockets, such as those types of sockets found on wall mounted and ceiling mounted candelabras and ceiling fans. The couplers can include plate members that are fastened in a sandwich configuration on both the inside and outside of the neck portion of the shade with the sandwiched plate members having an interior threaded surfaces. Modified lamp shades can be screwed to exterior threaded light sockets on candelabra lights, pendant lights, ceiling fan lights, and any other type of lamp sockets that have removable lamp shades.

5 Claims, 12 Drawing Sheets

(56) References Cited

U.S. PATENT DOCUMENTS

| | | | | |
|---|---|---|---|---|
| 6,755,559 | B2 | 6/2004 | Wang | |
| 6,758,578 | B1 * | 7/2004 | Chou | 362/647 |
| 6,817,739 | B2 | 11/2004 | Blateri | |
| 6,942,354 | B2 | 9/2005 | Metayer | |
| 8,118,449 | B2 | 2/2012 | Pawelko | |
| 8,556,477 | B2 * | 10/2013 | Ohai | 362/404 |
| 2007/0127234 | A1 | 6/2007 | Jervey | |
| 2007/0177390 | A1 | 8/2007 | Evans | |
| 2008/0232106 | A1 * | 9/2008 | Brune et al. | 362/267 |
| 2012/0327663 | A1 * | 12/2012 | Doan | 362/294 |

* cited by examiner

TWIST AND LOCK GLASS SHADE MOUNTING SYSTEM AND METHOD OF ASSEMBLY

FIELD OF INVENTION

This invention relates to light shade, in particular to devices, systems and methods of converting the necks on lamp shades into threadable couplers that allow the shades with the couplers to be screwed onto the exterior threads on light sockets, such as those types of sockets found on wall mounted and ceiling mounted candelabras and ceiling fans.

BACKGROUND AND PRIOR ART

FIG. 1A is an exterior view of a prior art base 1 for a candelabra light fixture. FIG. 1B is a cross-sectional view of the base 1 of FIG. 1A along arrows 1B. FIG. 2A is an exterior view of a prior art lamp shade 10 that can be used with the candelabra light fixture of FIG. 1A. FIG. 2B is a cross-sectional view of the shade 10 of FIG. 2B along arrows 2B.

Referring to FIGS. 1A-2B, a lamp shade 10 having an outwardly flaring out glass 12 with narrow neck 14 are often attached to a candelabra type base 1 by orienting the neck portion 14 over exterior threaded sides 4 of the electrical sockets 6. Next, a nut 20 is positioned into the wide opening of the shade 12 above a step edge 16. Threading the nut 20 onto the outer threads 4 of the socket 6 results in pushing the nut 20 against the step edge 16 in side of the shade 10, while a surface portion of the outer glass 12 abuts against an upper edge 3 of the base 1. However, these types of popular attachment techniques have several problems.

One problem is the narrow part of the inside of the lamp shade near the narrow neck space makes it difficult to reach with one's fingers. Holding a nut can be difficult in this narrow space, especially when an installer is reaching upward to remove or install shades onto light socket that are above their heads.

The use of a spanner wrench or spanner tool has been used for tightening these hard to reach nuts. However, the spanner wrench adds an additional cost and expense to the installation.

Other types of fastening techniques have uses thumb screws that pass through the outer surfaces 2 of the base 1, which are then tightened to abut against surface portions on the outside of the shade neck 14. However, these small screws are also hard to manipulate with one's fingers. Additionally, the screws can easily become dropped and lost during installation. Still furthermore, with candelabras type lights mounted to ceiling fans, vibrations have caused these small screws to become loose and fall out. A falling glass shade can be easily broken and also be a danger to persons underneath the light fixture.

Thus, the need exists for solutions to the above problems with the prior art.

SUMMARY OF THE INVENTION

A primary objective of the present invention is to provide devices, systems and methods of converting the necks on lamp shades into threadable couplers that allow the shades with the couplers to be screwed onto the exterior threads on light sockets, such as those types of sockets found on wall mounted and ceiling mounted candelabras and ceiling fans.

A secondary objective of the present invention is to provide devices, systems and methods of providing adapters for light shades for screwing the shades onto exterior threads of light sockets.

A third objective of the present invention is to provide devices, systems and methods for mounting lamp shades onto exterior threaded light sockets without having to position a nut into a shade being held up to a socket.

A fourth objective of the present invention is to provide devices, systems and methods for mounting lamp shades onto exterior threaded light sockets without using a spanner wrench or spanner tool.

A fifth objective of the present invention is to provide devices, systems and methods for mounting lamp shades onto exterior threaded light sockets without using small thumb screws.

A screwable lamp shade can include a lamp shade having an enlarged wide end and a narrow neck end, an insert ring having a threaded interior surface for being positioned into the wide end of the lamp shade, an exterior ring having an internal threaded surface for being positioned on the outside of the bottom of the neck end of the shade, and a connector for attaching the insert ring to the exterior ring to form a hollow coupler having an internal threaded surface that allows for the lamp shade to screw onto exterior threads of a lamp socket.

The connector can include mounting screws for attaching the insert ring to the exterior ring.

The screwable lamp shade can further include a washer located between the insert ring and the exterior ring.

The insert ring can include an elongated base protruding from the ring, the base having internal threaded surface and an exterior threaded surface, wherein the exterior ring is a locking ring has internal threads for tightening about the exterior threaded surface of the base on the insert ring.

The screwable lamp shade can further include at least one washer between the locking ring and the insert ring.

A method for converting a lamp shade into a screwable lamp shade for attachment to light fixtures having threaded surfaces about sockets, can include the steps of providing a lamp shade having a narrow neck and enlarged shade end, providing a lamp socket having exterior threads about the socket, providing an insert ring having an outer diameter larger than the neck of the shade, the insert ring having an internal threaded surface, providing an exterior ring having an outer diameter larger than the neck of the shade, the exterior ring having an internal threaded surface, positioning the insert ring into the lamp shade to rest adjacent to the neck; positioning the exterior ring to rest against the outer end of the neck; attaching the interior ring to the exterior ring so that the neck is sandwiched therebetween to form a coupler on the lamp shade with an internal threaded surface, and screwing the coupler with attached lamp shade onto the exterior threads of the socket.

The method can include the step of attaching the insert ring to the exterior ring with mounting screws.

The method can include the step of positioning a washer between the insert ring and the exterior ring.

The method can include the steps of protruding an elongated base from the ring, the base having internal threaded surface and an exterior threaded surface, and providing internal threads for the exterior ring to form a locking ring for tightening about the exterior threaded surface of the base on the insert ring.

The method can include the step of providing at least one washer between the locking ring and the insert ring.

A coupler adapter for converting a lamp shade into a screwable lamp shade for attachment to light fixtures having threaded surfaces about sockets, can include a first ring member adapted to be inserted into a wide opening of a lamp shade to rest adjacent to a neck portion inside the lamp shade, a second ring member adapted to rest against an exterior opening to the neck portion of the lamp shade, attachment members to attach the first ring member and the second member in a sandwich configuration through the neck portion of the lamp shade, and an interior threaded surface between the first ring member and the second ring member, the interior threaded surface adapted to be able to screw the lamp shade onto exterior threaded surface of a light fixture socket.

The first ring member can include a raised rim having female sockets therein. The second ring member includes: plural holes.

The coupler adapter can include plural fasteners for attaching the first ring member to the second ring member. The coupler adapter can include a washer positioned between the first ring member and the second ring member.

The first ring member can include an elongated base protruding from the first ring member, the base having internal threaded surface and an exterior threaded surface, wherein the second ring member has internal threads for tightening about the exterior threaded surface of the base on the first ring member. The coupler adapter can include at least one washer between the first ring member and the second ring member.

The coupler parts can also be switched as follows. The second ring member can have an elongated base protruding from the second ring member, the base having internal threaded surface and an exterior threaded surface, wherein the first ring member has internal threads for tightening about the exterior threaded surface of the base on the second ring member. The coupler adapter can also include at least one washer between the first ring member and the second ring member.

Further objects and advantages of this invention will be apparent from the following detailed description of the presently preferred embodiments which are illustrated schematically in the accompanying drawings.

DESCRIPTION OF THE PREFERRED EMBODIMENTS

Figure 1A:
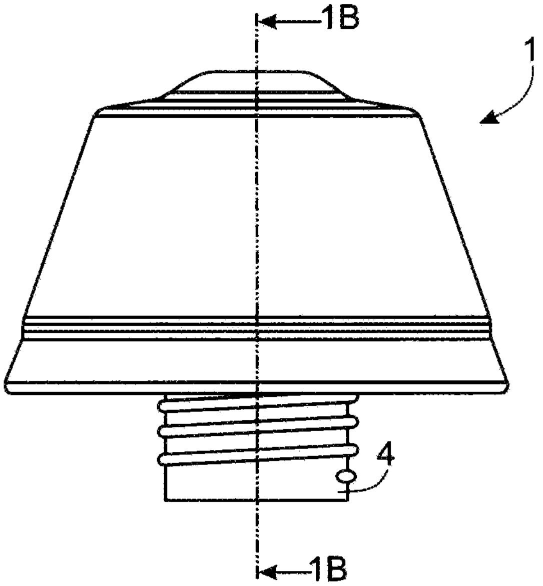
FIG. 1A(Prior Art)
FIG. 1A is an exterior view of a prior art base for a candelabra light fixture.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

A listing of the components will now be described.

1. Candelabra base
2. outer wall of base forms cup fixture
3. upper edges of base
4. exterior threads on socket
6. electrical socket that accepts male end of bulb.
10. shade
12. flaring out(expanding) portion of shade
14. narrow neck
16. interior step edge
20. nut
30. bulb
100. threaded coupler
110. threaded insert
112. ring base of insert
114. cylindrical protrusion with exterior threaded surface
115. internal threaded surface
120. washer/O-ring
130. washer/O-ring
140. locking ring
142. ring base
144. gripable cylindrical protruding end
145. internal threaded surface
200. Second Embodiment coupler
210. Adapter ring plate
212. base of plate
214. raised ring from base
215 female sockets with threaded openings for receiving screws
220. washer/O-ring
230. flat adapter ring washer
235 holes for screws
240. mounting screws
300. other lamp shade
302. narrow short neck
306. interior step edge
310. flaring out end

First Embodiment

Figure 3:
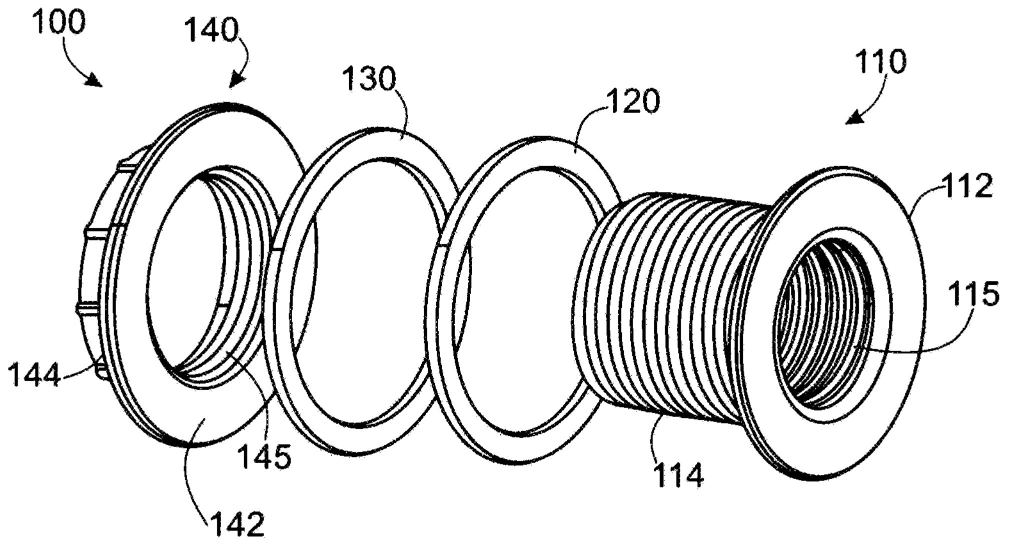
FIG. 3 is an exploded enlarged perspective view of the coupler components of the invention.

FIG. 3 is an exploded enlarged perspective view of the threaded coupler components 100 of the invention. The threaded coupler components 100 can include a threaded insert 110 having an enlarged ring base 112 having an outer diameter slightly smaller than the lamp shade diameter at step edge 16. The threaded insert 110 can have a smaller diameter cylindrical protrusion 114 with exterior threaded surface on one side of the ring base 112, having an internal threaded surface 115. A pair of washers/O-rings 120, 130 such as elastomeric or rubber type washers, can each have a central opening slightly larger than the outer diameter of the cylindrical protrusion 114. A locking ring 140 can include an enlarged ring base 142 and a narrower diameter gripable cylindrical protruding end 144 to one side with an internal threaded surface 145. The threaded insert 110 and the locking ring 140 can be formed from plastic, rubber, composites, metal and the like.

Figure 4:
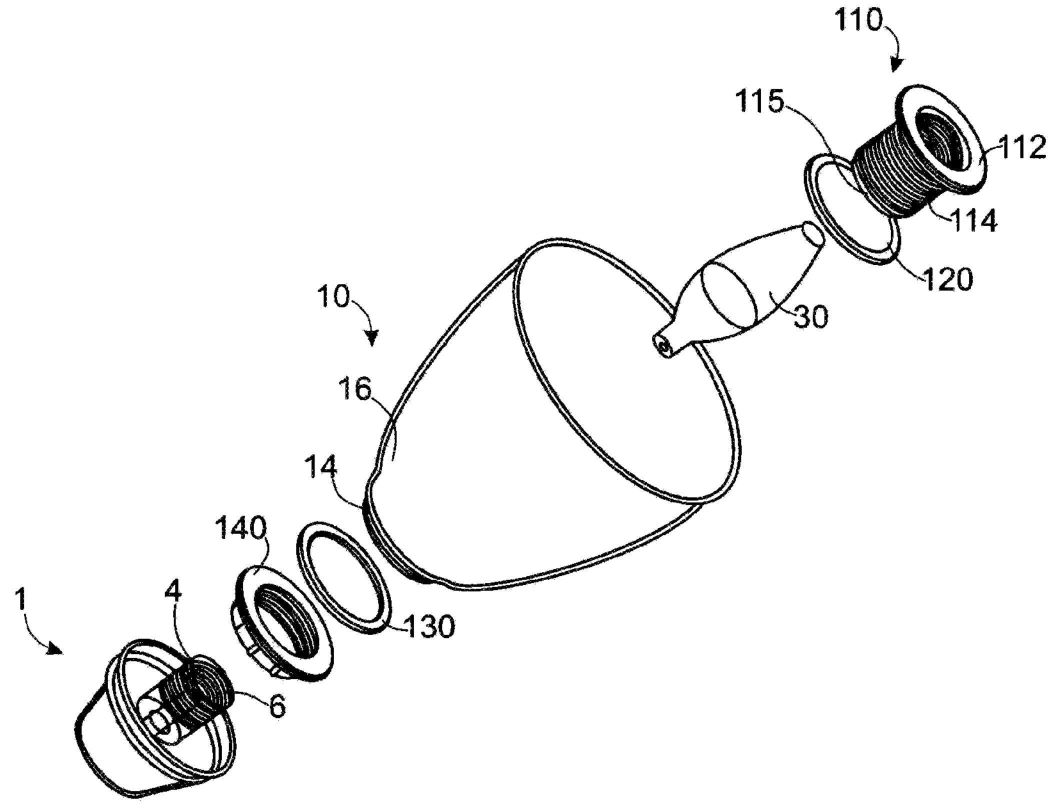
FIG. 4 is an exploded view of the threaded coupler components of FIG. 3 positioned and oriented with the lamp shade and base of FIGS. 1A-2B.

FIG. 4 is an exploded view of the threaded coupler components 100 of FIG. 3 positioned and oriented with the lamp shade 10 and candelabra base 1 of FIGS. 1A-2B. Here, the threaded insert 110 can be positioned so that the protruding end 114 passes through washer/O-ring 120 and is placed into the wide end of lamp shade 10 so that the ring base 112 with washer/O-ring 120 abuts against interior step 16 inside of shade 10. The locking ring 140 with washer/O-ring 130 can be screwed against the outer end of threaded insert protruding end 114. The shade 10 can be screwed to socket 6 by the interior threaded surface 115 of the threaded insert 110.

Figure 5:
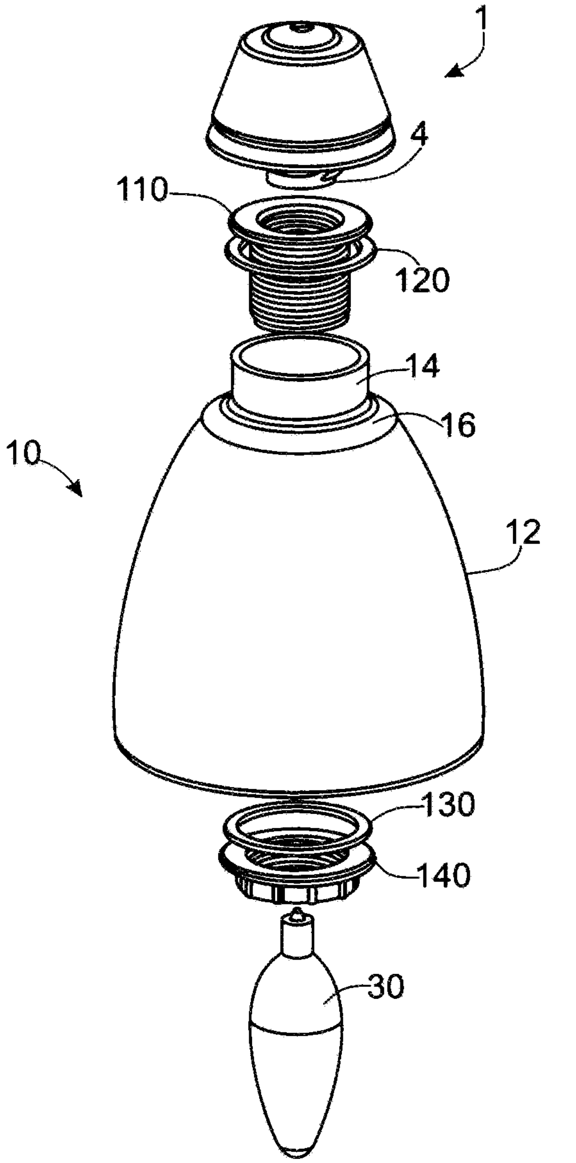
FIG. 5 is another exploded view of the coupler components of FIG. 3 positioned and oriented differently with the lamp shade and base of FIGS. 1A-2B.

FIG. 5 is another exploded view of the coupler components 100 of FIG. 3 positioned and oriented differently with the lamp shade 10 and candelabra base 1 of FIGS. 1A-2B.

Figure 2A:
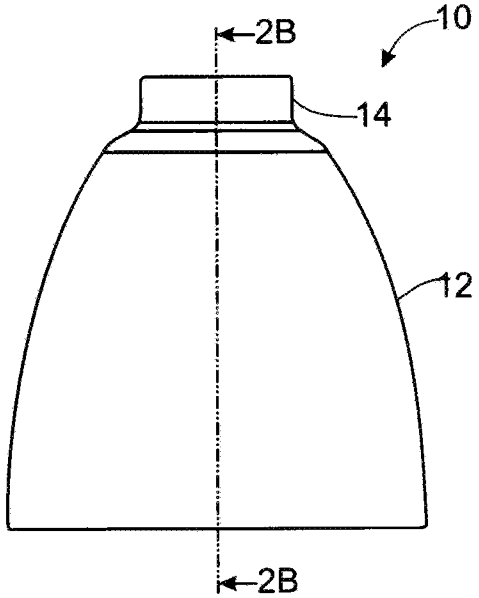
FIG. 2A(Prior Art)
FIG. 2A is an exterior view of a prior art lamp shade that can be used with the candelabra light fixture of FIG. 1A.
Figure 2B:
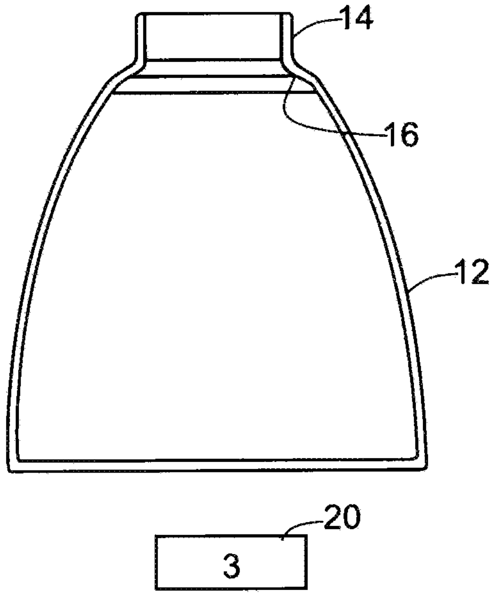
FIG. 2B(Prior Art)
FIG. 2B is a cross-sectional view of the shade of FIG. 2A along arrows 2B.
Figure 6A:
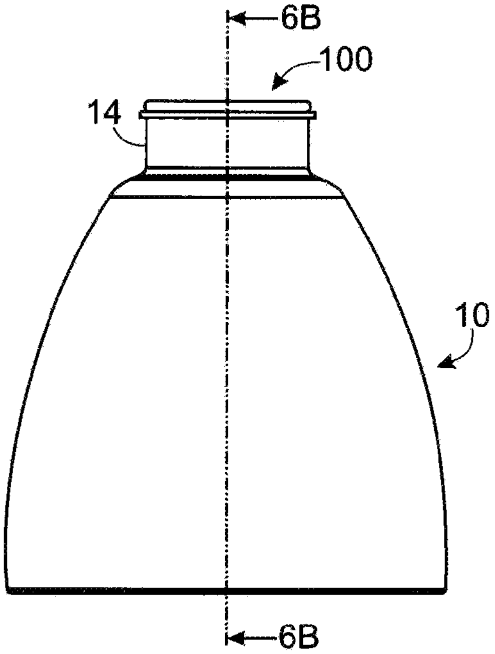
FIG. 6A is an exterior view of the lamp shade of FIGS. 2A-2B installed with the coupler components of FIG. 3 oriented as shown in FIG. 5.
Figure 6B:
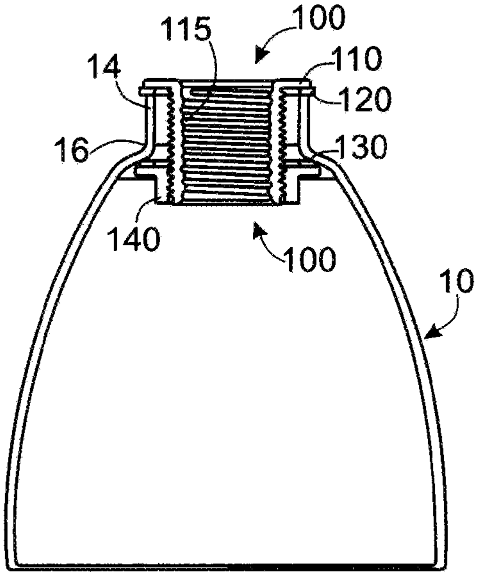
FIG. 6B is a cross-sectional view of the lamp shade with installed coupler of FIG. 6A along arrows 6B.

FIG. 6A is an exterior view of the lamp shade 10 of FIGS. 2A-2B installed with the coupler components 100 of FIG. 3 oriented as shown in FIG. 5. FIG. 6B is a cross-sectional view of the lamp shade 10 with installed coupler components 100 of FIG. 6A along arrows 6B.

Figure 1B:
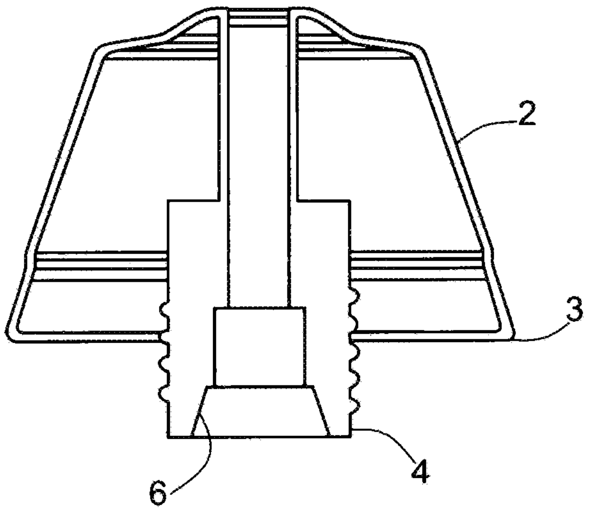
FIG. 1B(Prior Art)
FIG. 1B is a cross-sectional view of the base of FIG. 1A along arrows 1B.
Figure 7A:
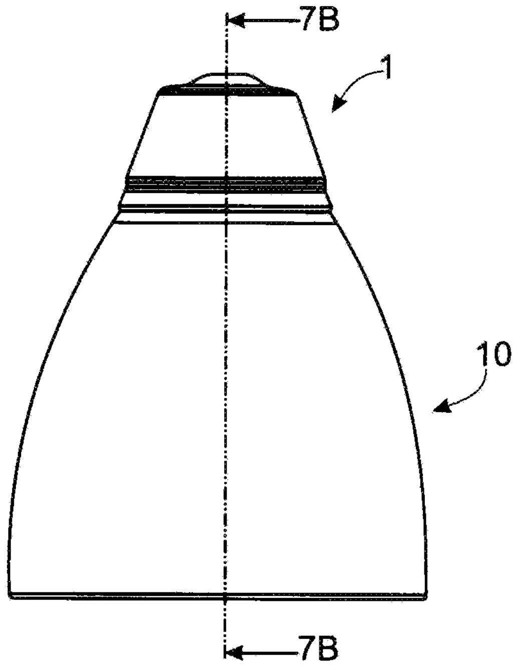
FIG. 7A is an exterior view of the lamp shade with installed coupler of FIGS. 6A-6B with attached to a candelabra base of FIGS. 1A-1B.
Figure 7B:
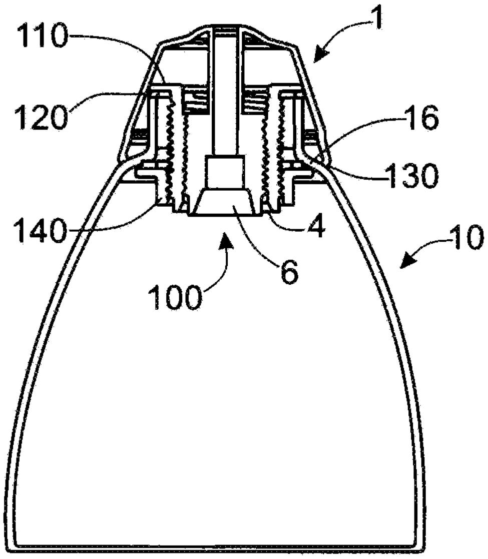
FIG. 7B is a cross-sectional view of the lamp shade with coupler attached to the candelabra base of FIG. 7A along arrows 7B.

FIG. 7A is an exterior view of the lamp shade 10 with installed coupler 100 of FIGS. 6A-6B with attached to a candelabra base 1 of FIGS. 1A-1B. FIG. 7B is a cross-sectional view of the lamp shade 10 with coupler 100 attached to the candelabra base 1 of FIG. 7A along arrows 7B.

Figure 8A:
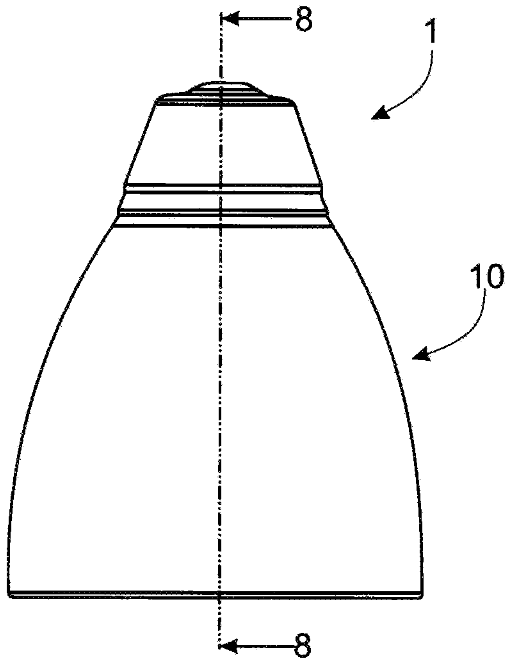
FIG. 8A is an exterior view of the lamp shade with coupler attached to the base of FIGS. 7A-7B with a bulb in the socket.
Figure 8B:
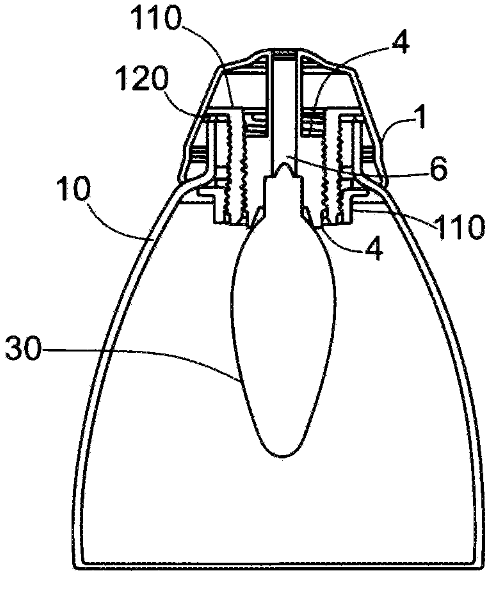
FIG. 8B is a cross-sectional view of the lamp shade with coupler attached to base and bulb of FIG. 8A along arrows 8B.

FIG. 8A is an exterior view of the lamp shade 10 with coupler 100 attached to the base 1 of FIGS. 7A-7B with a bulb 30 in the socket 6. FIG. 8B is a cross-sectional view of the lamp shade 10 with coupler 100 attached to base 1 and bulb 30 of FIG. 8A along arrows 8B.

Referring to FIGS. 1A-3 and 5-8B, the novel coupler components 100 can be assembled with the protruding end 114 of the threaded insert 110 with washer 120 inserted into the top open end of the narrow neck 14 of the shade 10. Next, washer 130 can be inserted into the wide open end of the shade 10 to pass around the protruding end 114 of the threaded insert. Next, the internal threads of the locking ring 140 can be screwed about the external threads on the protruding end 114 of the threaded insert 110 until the ring base 142 abuts against the inside step edge 16 in the lamp shade 10. Tightening the locking ring causes a tight and sealing fit between the coupler components 100 and results in the configuration shown in FIGS. 6A-6B.

The lamp shade with threaded coupler 100 can then be screwed onto the external threads 4 on the socket 6 in the candelabra base 1, until an outer surface portion of the shade 12 contacts the upper edge 3 of the candelabra base 1, as shown in FIGS. 1A-2B, 4, 5 and 7A-7B. Finally, a bulb 30 can be screwed or pushed into the electrical socket 6 as shown in FIGS. 8A-8B.

While the threaded coupler 100 is shown with the threaded insert 110 inside the lamp shade 10 and the locking ring 140 located outside the lamp shade 10, the parts can be reversed with the threaded insert 110 located outside the lamp shade 10 and the locking ring 140 located inside the lamp shade 300.

Second Embodiment

Figure 9:
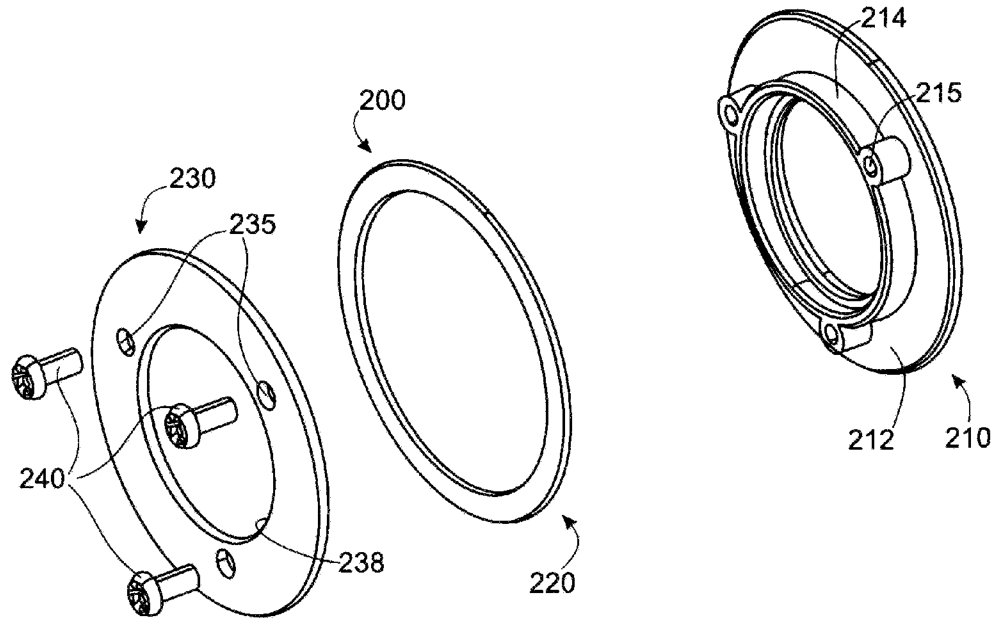
FIG. 9 is an exploded perspective view of another embodiment of threading adapter coupler components for lamp shades.
Figure 10:
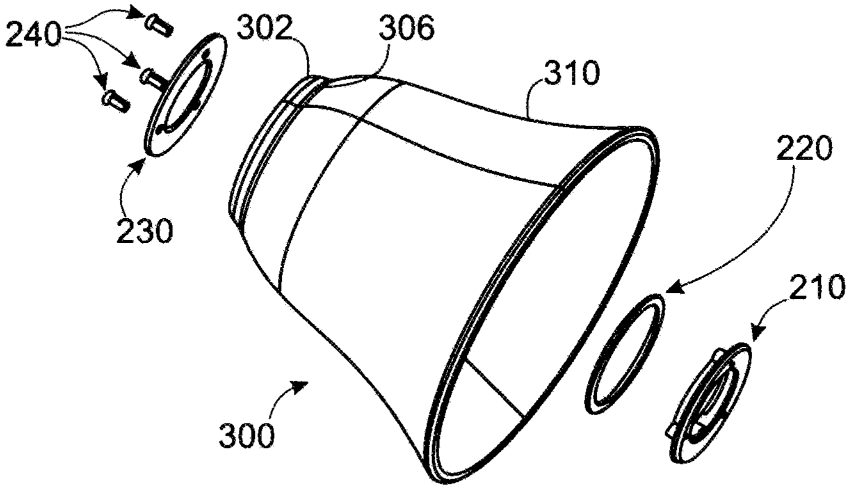
FIG. 10 is an exploded perspective view of the adapter components of FIG. 9 with a lamp shade.
Figure 11:
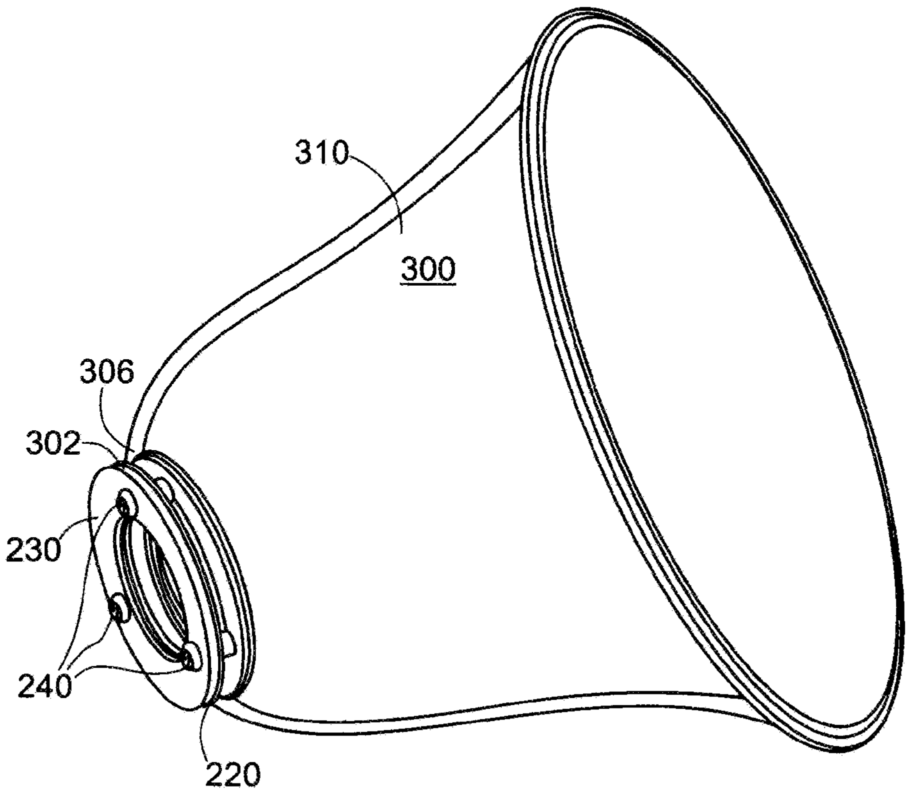
FIG. 11 is a perspective view of the threaded adapter components of FIGS. 9-10 mounted to a lamp shade.
Figure 12:
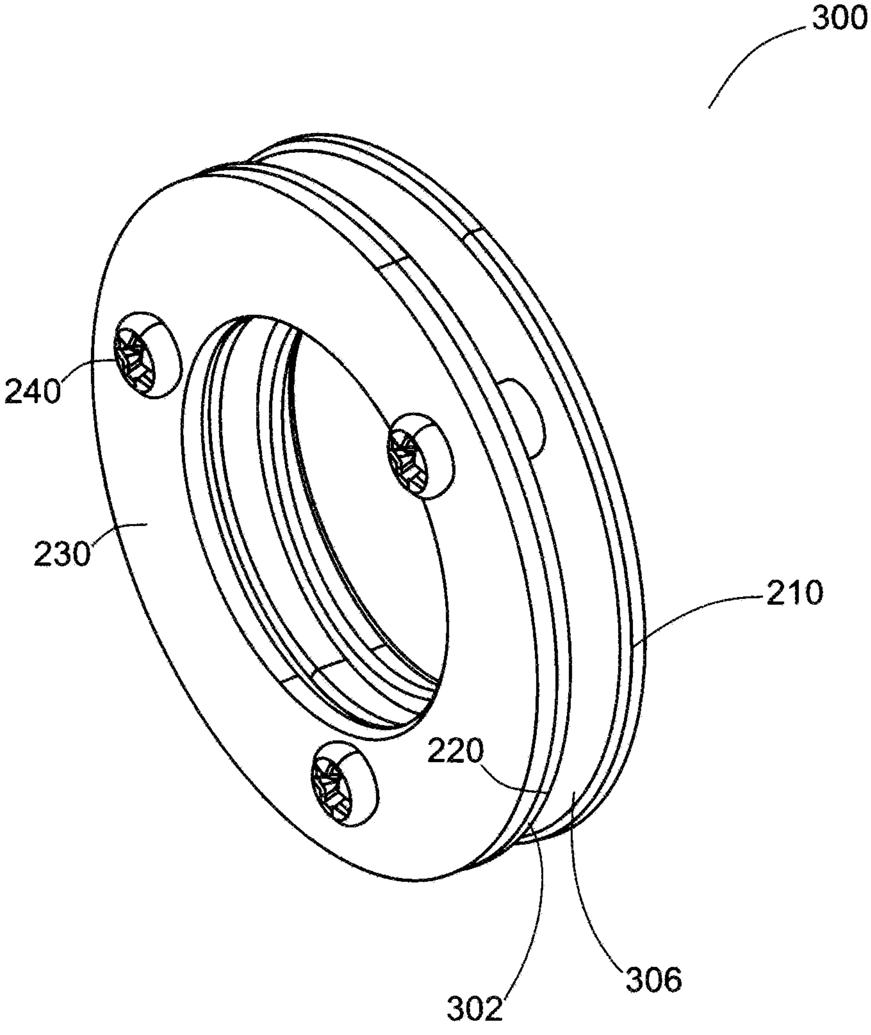
FIG. 12 is an enlarged perspective view of the threaded adapter components mounted to a lamp shade of FIG. 11.

FIG. 9 is an exploded perspective view of another embodiment of threading adapter coupler components 200 for a lamp shade 300. FIG. 10 is an exploded perspective view of the adapter coupler components 200 of FIG. 9 with a lamp shade 300. FIG. 11 is a perspective view of the threaded adapter coupler components 200 of FIGS. 9-10 mounted to a lamp shade 300. FIG. 12 is an enlarged perspective view of the threaded adapter coupler components 200 mounted to the lamp shade 300 of FIG. 11.

Referring to FIGS. 9-12, an adapter ring plate 210 has an enlarged base type ring 212 is positioned into the open flared end 310 of lamp shade 300 with edges of the base ring 212 to rest against interior step edge 306 so that narrower diameter raised ring 214 with plural female fastener sockets 215 protrudes through the lamp shade neck 302. Next, the washer/O-ring 220 is positioned against the outside of the narrow lamp shade neck 302. The washer/O-ring 220 can have an outer diameter similar to the outer diameter of the adapter ring washer 230 and have an opening with a diameter larger than the opening diameter of the adapter ring washer 230.

The flat adapter ring washer 230 is positioned against the washer/O-ring 220 so that the holes 235 in the adapter ring 230 can line up with the fastener sockets 215 in the adapter ring plate. Finally, mounting screws 240 are screwed through each of the ring washer holes 235 and screwed into the threaded openings of the female sockets 215 of the adapter ring plate.

The interior edge 238 of the adapter ring washer 230 with or without the washer/O-ring 220 can form a threaded interior surface. With the coupling components 200 fit into place in and around both ends of the narrow neck 302, of the lamp shade 300, the modified lamp shade 300 is ready to be screwed about external threaded surfaces of an electrical socket as described in the previous embodiment.

The washer/O-ring 220 can be similar in material to the previous embodiment washers/O-rings. The adapter ring washer 230 and adapter ring plate can be formed form materials, such as but not limited to plastic, rubber, composites, metal and the like.

Although the adapter ring plate 210 is shown inside the lamp shade 300 and the adapter ring washer 230 is outside the lamp shade 300, the location of the parts can reversed with the adapter ring plate 210 outside the lamp shade 300 and the adapter ring washer 230 located inside the lamp shade 300. If reversed, the screw type fasteners can pass through holes in the adapter ring plate to thread into female receiving holes in the adapter ring washer.

The novel invention coupler adapters can be placed on the narrow neck portions of lamp shades in factories and prepackaged with the lamp shades, candelabras, ceiling fans, etc., so that the installer only needs to thread the glass type lamp shade onto the externally threaded light fixture sockets.

Additionally, the novel coupler adapters can be manufactured and sold in kit forms so that existing lamp shades can be retrofitted to be able to screw the lamp shades on the externally threaded light fixture sockets Although screw type fasteners are shown in the embodiments other types of fasteners, such as but not limited to bolts, rivets, resilient bendable fasteners, and the like, can be used.

The invention can be used with any types of threaded sockets for wall and ceiling mounted fixtures, such as but not limited to candelabras, canopy lights, as well as pendant lights (hanging lights, and the like) as well as with lights on ceiling fans, and the like. Additionally, electrical sockets with non threaded surfaces can be modified to have threaded surfaces so as to use the novel invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A screwable lamp shade consisting of:

a lamp shade having an enlarged wide end which narrows down to a narrow neck end with an opening therethrough;

an insert ring having a threaded interior surface for being positioned into the wide end of the lamp shade to rest adjacent to the narrow neck end inside of the lamp shade;

an exterior ring having an internal threaded surface for being positioned on the outside of the bottom of the neck end of the shade on an opposite side of the narrow neck end to the insert ring;

at least one washer between the exterior ring and the insert ring; and a connector for attaching the insert ring to the exterior ring in a sandwich configuration on both sides of the narrow neck end, the connector forming a hollow coupler with an internal threaded surface that allows for the lamp shade to screw onto exterior threads of a lamp socket, wherein the connector includes mounting screws for attaching the insert ring to the exterior ring.

2. A method for converting a lamp shade into a screwable lamp shade for attachment to light fixtures having threaded surfaces about sockets, consisting of the steps of:

providing a lamp shade having an enlarged shade end which narrows down to a neck end with an opening therethrough;

providing a lamp socket having exterior threads about the socket;

providing an insert ring having an outer diameter larger than the neck of the shade, the insert ring having an internal threaded surface;

providing an exterior ring having an outer diameter larger than the neck of the shade, the exterior ring having an internal threaded surface;

positioning the insert ring into the lamp shade to rest adjacent to the neck;

positioning the exterior ring to rest against the outer end of the neck opposite to the insert ring;

attaching the interior ring to the exterior ring with mounting screws so that the neck is sandwiched therebetween to form a coupler on the lamp shade with an internal threaded surface, positioning at least one washer between the insert ring and the exterior ring: and screwing the coupler with attached lamp shade onto the exterior threads of the socket.

3. A coupler adapter for converting a lamp shade into a screwable lamp shade for attachment to light fixtures having threaded surfaces about sockets, consisting in combination:

a lamp shade having a wide opening which narrows down to a neck portion having a smaller opening therethrough;

a first ring member adapted to be inserted into the wide opening of the lamp shade to rest adjacent to the neck portion inside the lamp shade;

a second ring member adapted to rest against an exterior opening to the neck portion of the lamp shade on an opposite side of the neck portion to the first ring member;

attachment members to attach the first ring member and the second member in a sandwich configuration on both sides of the neck portion of the lamp shade, the attachment members include mounting screws for attaching the first ring member to the second ring member;

a washer positioned between the first ring member and the second ring member; and an interior threaded surface formed inside the sandwich configuration of the first ring member and the second ring member, the interior threaded surface adapted to be able to screw the lamp shade onto exterior threaded surface of a light fixture socket.

4. The coupler adapter of claim 3, wherein the first ring member includes: a raised rim having female sockets therein.

5. The coupler adapter of claim 4, wherein the second ring member includes: plural holes.

* * * * *